United States Patent
Lingle

(10) Patent No.: US 6,749,941 B2
(45) Date of Patent: Jun. 15, 2004

(54) INSULATING GLASS (IG) WINDOW UNIT INCLUDING HEAT TREATABLE COATING WITH SILICON-RICH SILICON NITRIDE LAYER

(75) Inventor: Philip J. Lingle, Temperance, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 174 days.

(21) Appl. No.: 10/097,099

(22) Filed: Mar. 14, 2002

(65) Prior Publication Data

US 2003/0175527 A1 Sep. 18, 2003

(51) Int. Cl.⁷ .............................................. B32B 17/06
(52) U.S. Cl. ........................ 428/432; 428/34; 428/428; 428/448; 428/450; 428/666; 428/673; 428/680; 428/698; 428/704; 427/165
(58) Field of Search ........................ 427/165; 428/34, 428/428, 432, 448, 450, 666, 673, 680, 698, 704

(56) References Cited

U.S. PATENT DOCUMENTS

| | | |
|---|---|---|
| 4,799,745 A | 1/1989 | Meyer et al. |
| 4,965,121 A | 10/1990 | Young et al. |
| 5,332,888 A | 7/1994 | Tausch et al. |
| 5,344,718 A | 9/1994 | Hartig et al. |
| 5,376,455 A | 12/1994 | Hartig et al. |
| 5,514,476 A | 5/1996 | Hartig et al. |
| 5,521,765 A | 5/1996 | Wolfe |
| 5,557,462 A | 9/1996 | Hartig et al. |
| 5,563,734 A | 10/1996 | Wolfe et al. |
| 5,584,902 A | 12/1996 | Hartig et al. |
| 5,800,933 A | 9/1998 | Hartig et al. |
| 5,837,108 A | 11/1998 | Lingle et al. |
| 6,014,872 A | 1/2000 | Hartig et al. |
| 6,059,909 A | 5/2000 | Hartig et al. |
| 6,492,619 B1 * | 12/2002 | Sol .............................. 219/203 |
| 6,514,620 B1 | 2/2003 | Lingle et al. |
| 6,524,688 B1 | 2/2003 | Eby et al. |
| 6,576,349 B2 | 6/2003 | Lingle et al. |
| 6,586,102 B1 | 7/2003 | Stachowiak |
| 6,605,358 B1 | 8/2003 | Stachowiak |
| 6,625,875 B2 | 9/2003 | Sol |
| 2003/0049464 A1 | 3/2003 | Glenn et al. |
| 2003/0194570 A1 | 10/2003 | Lingle et al. |

FOREIGN PATENT DOCUMENTS

| | | |
|---|---|---|
| WO | WO 01/66482 | 9/2001 |
| WO | WO 01/66483 | 9/2001 |
| WO | WO 02/04375 | 1/2002 |

OTHER PUBLICATIONS

"Optical Interference Coatings", Jun. 5–9, 1995, 1995 Technical Digest Series, vol. 17, pp. 115–117.

* cited by examiner

Primary Examiner—Terrel Morris
Assistant Examiner—Andrew T Piziali
(74) Attorney, Agent, or Firm—Nixon & Vanderhye P.C.

(57) ABSTRACT

An insulating glass (IG) window unit, or other suitable window unit, includes a glass substrate with a coating thereon. The coating includes at least one silicon nitride inclusive layer that is Si-rich (i.e., non-stoichiometric). By making the silicon nitride inclusive layer Si-rich, it has been found that coloration can be adjusted in order to achieve certain desirable optical characteristics.

32 Claims, 2 Drawing Sheets

INSULATING GLASS (IG) WINDOW UNIT INCLUDING HEAT TREATABLE COATING WITH SILICON-RICH SILICON NITRIDE LAYER

Certain embodiments of this invention relate to an insulating glass (IG) window unit including a heat treatable coating having a silicon (Si) rich silicon nitride inclusive layer in order to achieve desired optical characteristics in the window unit. Other embodiments of this invention relate to a heat treatable coated article including a Si-rich silicon nitride inclusive layer in order to achieve desired color.

BACKGROUND AND SUMMARY OF THE INVENTION

Coated articles and IG window units are known in the art. For example, see U.S. Pat. Nos. 5,514,476, 5,800,933 and 6,014,872.

Commonly owned U.S. patent application Ser. No. 09/978,184, filed Oct. 17, 2001 (hereby incorporated herein by reference) discloses a coated article as follows, from the glass substrate outwardly (the top tin oxide layer may be omitted in certain instances) with example thicknesses listed in units of angstroms (Å):

TABLE 1

Example Coating of 09/978,184

| Layer | Preferred Range (Å) | More Preferred (Å) | Example (Å) |
|---|---|---|---|
| Glass Substrate | | | |
| $TiO_2$ | 0–700 Å | 100–400 Å | 200 Å |
| $ZnO_x$ | 25–200 Å | 40–150 Å | 90 Å |
| Ag | 50–250 Å | 80–200 Å | 130 Å |
| $NiCrO_x$ | 5–100 Å | 15–60 Å | 30 Å |
| $SnO_2$ | 0–1,000 Å | 500–900 Å | 680 Å |
| $ZnO_x$ | 25–200 Å | 40–150 Å | 90 Å |
| Ag | 50–250 Å | 80–220 Å | 168 Å |
| $NiCrO_x$ | 5–100 Å | 15–60 Å | 30 Å |
| $SnO_2$ | 0–500 Å | 70–200 Å | 125 Å |
| $Si_3N_4$ | 0–500 Å | 120–320 Å | 220 Å |

When the aforesaid coated article is coupled with another glass substrate in order to make an IG window unit, the resulting IG window unit (not heat treated (HT)) generally has the following optical characteristics (Ill. C, 2 degree observer):

TABLE 2

Optical Characteristics of IG Window Units with Above Coating (non-HT)

| Characteristic | General | More Preferred |
|---|---|---|
| $T_{vis}$ (or TY) (transmissive): | >=69% | >=70% |
| $a^*_t$: | −6.0 to +1.0 | −5.0 to −2.0 |
| $b^*_t$: | −1.0 to 4.0 | 0.5 to 3.5 |
| $R_gY$ (glass side): | 5 to 15% | 8 to 12% |
| $a^*_g$: | −4.0 to +2.0 | −3.0 to −1.0 |
| $b^*_g$: | −4.0 to +2.0 | −3.0 to +1.5 |
| $L^*_g$: | 34 to 42 | 36 to 40 |
| $R_fY$ (film side): | 5 to 18% | 9 to 15% |
| $a^*_f$: | −5.0 to +4.0 | −3.0 to +2.0 |
| $b^*_f$: | −8.0 to +8.0 | −5.0 to +6.0 |
| $L^*_f$: | 33 to 48 | 35 to 45 |

In Table 2 above, $T_{vis}$ stands for visible light transmission, and $a^*_t$ and $b^*_t$ stand for transmissive (t) a* and b* color values, respectively. Glass side (g) and film side (f) values are presented in a similar manner. It is noted that the color values herein (e.g., a*, b*, L*) are calculated in accordance with the CIE LAB 1976 L*, a*, b* coordinate technique.

The IG units of Tables 1–2 (and thus Ser. No. 09/978,184) are not heat treated (HT). However, in commercial applications, at least some IG units often are required to be heat treated (e.g., tempered) for safety purposes. In office buildings for example, it is often desirable that some windows be heat treated while others need not be. Thus, a need for matchability (before heat treatment vs. after heat treatment) arises. In other words, it is desirable that window units which are heat treated (HT) substantially or approximately match their non-heat treated counterparts (e.g., with regard to color, visible transmission, reflectance, and/or the like), at least with respect to transmissive and glass side reflective optical characteristics, for architectural and/or aesthetic purposes.

Unfortunately, coatings of Ser. No. 09/978,184 cannot withstand HT without significant color and/or durability change. Thus, coatings of Ser. No. 09/978,184 cannot be HT and then used commercially to achieve matchability with their non-HT counterparts.

It will be apparent from the above that there exists a need in the art for coatings that, upon HT, approximately match non-HT coatings of Ser. No. 09/978,184 in the context of IG window units with regard to visible transmission, visible reflectance, transmissive color, and/or glass side reflective color.

While coatings having multiple infrared (IR) reflecting Ag layers are desirable in certain instances, they tend to have very low sheet resistance ($R_s$) values thereby making them difficult to easily HT (without resulting in damage or becoming prohibitively costly) using inexpensive HT processing/machinery. This is because the dual Ag layers tend to reflect much of the energy in the furnace intended for tempering the underlying glass substrate. Single silver coatings, with higher sheet resistances, are easier to HT in this regard. Thus, in certain example non-limiting instances it would be desirable for coatings herein to achieve the aforesaid matchability and/or be of the single Ag layer type (or have higher $R_s$) so that they can be more easily heat treated using conventional low-tech radiant tempering furnaces.

U.S. Pat. Nos. 5,514,476 and 5,800,933 discloses coated articles including: glass substrate/$Si_3N_4$/NiCr/Ag/NiCr/$Si_3N_4$. Unfortunately, upon HT and use in an IG unit, the resulting IG units do not approximately match the general aforesaid optical characteristics of IG units set forth in Table 2.

WO 02/04375 discloses a dual-silver low-E coating have good color characteristics after HT and lamination. Unfortunately, the coatings of WO 02/04375 require multiple silver (Ag) layers and have very low sheet resistance ($R_s$) (e.g., about 4–5 ohms/square) before HT. This makes the coatings of WO 02/04375 difficult to HT using conventional low-tech radiant tempering furnaces since the dual Ag layers reflect much of the energy intended for tempering the underlying glass substrate. It is noted that WO 02/04375 is a counterpart to U.S. Ser. No. 09/794,224, filed Feb. 28, 2001.

An object of certain example embodiments of this invention is to provide a coating that, upon HT and in the context of IG window units, approximately matches an IG unit including a non-HT coating of Ser. No. 09/978,184 (see general desired optical characteristics in Table 2 above) with respect to visible transmission ($T_{vis}$), visible glass side reflectance ($R_gY$), transmissive color (a* and/or b*), and/or glass side reflective color (a* and/or b*).

Another object of certain example embodiments of this invention is to provide a single silver (Ag) coating (i.e., including only one Ag layer) that, upon HT and in the context of IG window units, approximately matches an IG unit including a non-HT coating of Ser. No. 09/978,184 with respect to visible transmission ($T_{vis}$), visible glass side reflectance ($R_gY$), transmissive color (a* and/or b*), and/or glass side reflective color (a* and/or b*).

In certain example embodiments of this invention, it would be desirable for the coating, prior to HT, to have a sheet resistance ($R_s$) prior to HT of at least 8 ohms/square, more preferably of at least 10 ohms/square, and sometimes from about 11 to 20 ohms/square, so that the coating can be easily HT while on a supporting glass substrate in conventional low-tech radiant tempering furnaces. In certain example embodiments, the coating has only one Ag layer.

Another object of certain example embodiments of this invention is to provide a heat treatable coating that achieves certain desired color characteristics (whether corresponding to non-HT coatings of Ser. No. 09/978,184 or not) through the use of a layer comprising Si-rich (non-stoichiometric) silicon nitride.

Another object of certain example embodiments of this invention is to provide a heat treatable coating that includes a non-stoichiometric silicon nitride layer, wherein the amount of Si in the layer is adjusted (i.e., increased relative to stoichiometric $Si_3N_4$) so as to increase the layer's index of refraction "n" and/or extinction coefficient "k", in order to achieve desired optical characteristics.

Another object of this invention is to fulfill one or more of the above-listed objects and/or needs.

Certain example embodiments fulfill one or more of the above-listed objects and/or needs by providing an insulating glass (IG) window unit comprising first and second glass substrates spaced apart from one another so that a space is provided therebetween, at least the first glass substrate being thermally tempered and supporting a coating, wherein the coating comprises: a first dielectric layer comprising silicon nitride $Si_xN_y$, a first contact layer, a layer comprising Ag, a second contact layer, wherein the layer comprising Ag is located between and directly contacts each of said first and second contact layers, and a second dielectric layer, wherein the first dielectric layer comprising silicon nitride $Si_xN_y$ is Si-rich so that x/y is from 0.76 to 2.0, and so that after thermal tempering of the first substrate with the coating thereon the coating has a sheet resistance ($R_s$) of at least 7 ohms/square (7 or higher), and wherein the IG window unit has a visible transmission of at least 69%, transmissive a* color of from –6.0 to 1.0, transmissive b* color of from –1.0 to 4.0, glass side reflective a* color of from –4.0 to 2.0, and glass side reflective b* color of from –4.0 to 3.0.

Certain other example embodiments of this invention fulfill one or more of the above-listed objects and/or needs by providing an insulating glass (IG) window unit comprising: first and second glass substrates spaced apart from one another, the first glass substrate supporting a coating, wherein the coating comprises: a first dielectric layer comprising silicon nitride $Si_xN_y$, only one layer comprising Ag, a second dielectric layer, and wherein the first dielectric layer comprising silicon nitride $Si_xN_y$ is characterized in that x/y is from about 0.76 to 2.0, and wherein the coating has a sheet resistance ($R_s$) of at least 6 ohms/square before and after heat treatment at temperature(s) of at least 500 degrees C.

Still further example embodiments of this invention fulfill one or more of the above-listed objects and/or needs by providing a method of making an IG window unit, the method comprising: forming a coating on a glass substrate so as to have a sheet resistance ($R_s$) of from 8 to 30 ohms/square before heat treatment, wherein the coating includes a layer comprising Ag and a dielectric layer comprising Si-rich silicon nitride having an index of refraction "n" of from 2.2 to 2.5 and an extinction coefficient "k" less than or equal to 0.06; thermally tempering the glass substrate having the coating thereon; and after the tempering, coupling the glass substrate with the coating thereon to another substrate to form an IG window unit having at least three of: (i) a visible transmission of at least 69%, (ii) transmissive a* color of from –6.0 to 1.0, (iii) transmissive b* color of from –1.0 to 4.0, (iv) glass side reflective a* color of from –4.0 to 2.0, and (v) glass side reflective b* color of from –4.0 to 3.0.

Yet other example embodiments of this invention fulfill one or more of the aforesaid objects and/or needs by providing a coated article comprising a glass substrate supporting a coating having a sheet resistance ($R_s$) of from 7 to 40 ohms/square before and/or after heat treatment, wherein the coating includes a layer comprising Ag and a dielectric layer comprising non-stoichiometric silicon nitride having an index of refraction "n" of from 2.2 to 2.5 and an extinction coefficient "k" less than or equal to 0.06.

DETAILED DESCRIPTION OF CERTAIN EXAMPLE EMBODIMENTS OF THE INVENTION

Certain embodiments of this invention relate to a coated article including a coating supported by a substrate. The coating may be provided either directly on and in contact with the underlying substrate, or alternatively may be provided on the substrate with other layer(s) therebetween. In certain embodiments, the coating includes at least one layer comprising silicon nitride that is silicon (Si) rich. By making the layer Si-rich, the index of refraction "n" and/or extinction coefficient "k" of the layer can be increased in amount (s) sufficient to achieve desired color (transmissive and/or glass side reflective) and/or other optical characteristics of the coating when used in a window unit (e.g., IG window unit, or any other suitable type of window unit). In certain example embodiments, the layer comprising silicon nitride may be Si-rich to an extent sufficient so that a resulting IG window unit including the heat-treated (HT) coating approximately matches an IG unit including a non-HT coating of Ser. No. 09/978,184 (see general desired optical characteristics in Table 2 above) with respect to visible transmission ($T_{vis}$), visible glass side reflectance ($R_gY$), transmissive color (a* and/or b*), and/or glass side reflective color (a* and/or b*).

Figure 1:
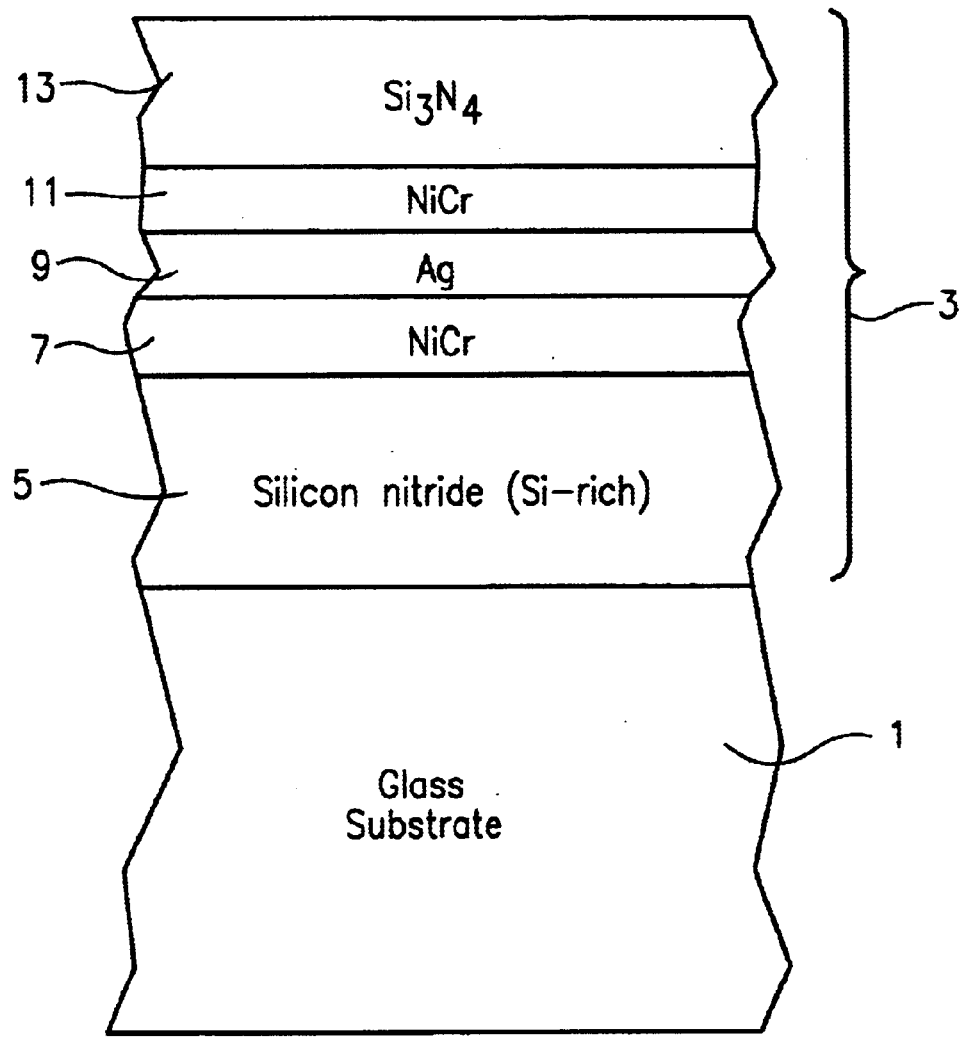
FIG. 1 is a cross sectional view of a coating on a substrate according to an example embodiment of this invention.

FIG. 1 illustrates a coating 3 according to an example embodiment of this invention, supported by glass substrate 1. Substrate 1 is preferably glass such as soda-lime-silica glass, borosilicate glass, or the like. As for glass color, substrate 1 may be clear, green, bronze, blue-green, grey, or any other suitable color in different embodiments of this invention, and is preferably from about 1.0 to 10.0 mm thick, more preferably from about 1.0 mm to 3.5 mm thick.

The coating 3 shown in FIG. 1 includes, from the glass substrate 1 outwardly, silicon nitride inclusive layer 5, bottom contact layer 7, infrared (IR) reflecting layer 9, top contact layer 11, and top dielectric layer 13. The "contact" layers 7 and 11 each contact IR reflecting layer 9. Infrared (IR) reflecting layer 9 is preferably metallic and conductive, and may be made of or include silver (Ag), gold, alloys thereof, or any other suitable IR reflecting material. However, metallic Ag is the material of choice for the IR reflecting layer 9 in certain example non-limiting embodiments of this invention. The IR reflecting layer enables coating 3 to have good solar control characteristics.

One or both of contact layers 7 and 11 may be of or include nickel (Ni), chromium (Cr), or an alloy of nickel-chrome (NiCr) in different embodiments of this invention. Alternatively, one or both of contact layers 7 and 11 may comprise nickel oxide, chromium/chrome oxide, a nickel alloy oxide such as nickel chrome oxide ($NiCrO_x$), a nickel alloy nitride such as nickel chrome nitride ($NiCrN_x$), or a nickel alloy oxynitride such as nickel chrome oxynitride ($NiCrO_xN_y$) in other example embodiments of this invention. When one or both of contact layers 7 and 11 comprise NiCr or $NiCrN_x$ in certain embodiments, the Ni and Cr may be provided in different amounts, such as in the form of nichrome by weight about 80–90% Ni and 10–20% Cr. In other embodiments, sputtering targets used in sputtering layer(s) 7 and/or 11 may be 50/50 Ni/Cr, 60/40 Ni/Cr, 70/30 Ni/Cr, or any other suitable weight ratio. An exemplary sputtering target for depositing these layers includes not only SS-316 which consists essentially of 10% Ni and 90% other ingredients, mainly Fe and Cr, but potentially Haynes 214 alloy as well (e.g., see U.S. Pat. No. 5,688,585). Optionally, one or both of contact layer(s) 7 and/or 11 may be oxidation and/or nitrogen graded in different embodiments of this invention so as to be more metallic closer to the IR reflecting layer and less metallic further from the IR reflecting layer 9. The contact layers 7 and 11 may or may not be continuous in different embodiments of this invention, depending upon their respective thicknesses.

Top dielectric layer 13 may comprise silicon nitride (e.g., stoichiometric $Si_3N_4$ or any other suitable non-stoichiometric form of silicon nitride) in certain example embodiments of this invention. In other embodiments, dielectric layer 13 may include silicon oxynitride, silicon oxide, or any other suitable dielectric material. Optionally, other layers may be provide on substrate 1 over dielectric layer 13 in certain embodiments of this invention.

In certain embodiments of this invention, dielectric layer 5 comprises a silicon-rich (Si-rich) form of silicon nitride (i.e., $Si_xN_y$, where x/y may be from about 0.76 to 2.0, more preferably from about 0.80 to 1.5, and most preferably from about 0.80 to 1.3). Surprisingly, it has been found that by making silicon nitride layer 5 non-stoichiometric and Si-rich, a coating can be realized which upon heat treatment (HT) and assembly into an IG window unit can approximately match an IG unit including a non-HT coating of Ser. No. 09/978,184 (see general desired optical characteristics in Table 2 above) with respect to visible transmission ($T_{vis}$), visible glass side reflectance ($R_gY$), transmissive color (a* and/or b*), and/or glass side reflective color (a* and/or b*). It is noted that the layer 5 comprising silicon nitride may or may not be partially oxided in certain embodiments of this invention.

Making the silicon nitride layer 5 non-stoichiometric by increasing its Si content causes the layer's index of refraction "n" and extinction coefficient "k" to increase (e.g., in the range of 350–550 nm). In particular, in certain example embodiments of this invention, increasing the Si content in silicon nitride layer 5 (i.e., making it Si-rich) causes the layer to have an index of refraction "n" (at 550 nm) of from 2.15 to 2.6, more preferably from 2.2 to 2.5, and most preferably from 2.35 to 2.45 (compare to an index of refraction "n" of 2.05 for stoichiometric $Si_3N_4$). As stated above, making layer 5 Si-rich causes both "n" and "k" to rise; however care is to be taken to make sure that "k" does not rise too much. In particular, if "k" becomes too high (e.g., greater than 0.07), an undesirable brown color can be realized in certain instances. Thus, it is sometimes desirable not to make the silicon nitride layer 5 too Si-rich. In certain embodiments of this invention, the Si content in the silicon nitride layer 5 is raised (to make it non-stoichiometric) to an extent such that the layer's extinction coefficient "k" (at 550 nm) is from 0 to 0.07, more preferably from 0 to 0.06, even more preferably from 0 to 0.05, and most preferably from 0.0001 to 0.05.

In certain example embodiments of this invention, coating 3 may include at least the below listed layers, from the glass substrate outwardly (example thicknesses listed in units of Å):

TABLE 3

Example Coatings 3

| Layer | Preferred Range (Å) | More Preferred (Å) | Example (Å) |
|---|---|---|---|
| Glass Substrate | | | |
| Si-rich silicon nitride: | 50–900 Å | 300–600 Å | 415 Å |
| NiCr | 4–50 Å | 4–25 Å | 10 Å |
| Ag | 25–300 Å | 50–200 Å | 95 Å |
| NiCr | 4–50 Å | 4–25 Å | 10 Å |
| $Si_3N_4$ | 50–900 Å | 300–500 Å | 470 Å |

Figure 2:
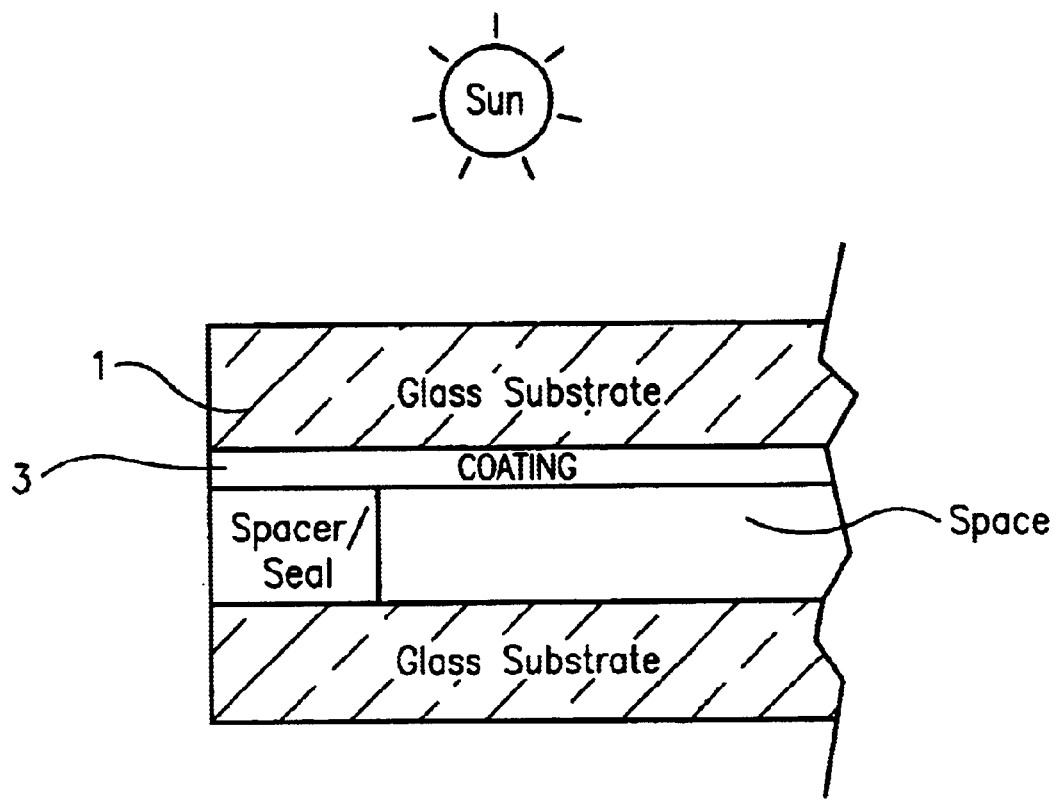
FIG. 2 is a cross sectional view of an insulating glass (IG) window unit including the coating of FIG. 1 according to an example embodiment of this invention.

FIG. 2 illustrates part of an IG window unit including the coating 3 of FIG. 1. As shown in FIG. 2, the coated substrate 1 is preferably coupled (after HT in certain instances) to another substrate (glass or plastic) via at least one spacer and/or seal so as to form an IG window unit. The space or gap between the opposing substrates may or may not be evacuated to a pressure below atmospheric in different embodiments of this invention. Moreover, the space or gap between the substrates may or may not be filled with a gas (e.g., Ar) in different embodiments of this invention.

Because layer 5 is Si-rich, certain example embodiments of this invention are able to achieve the following optical characteristics after HT (such HT often necessitates heating the coated substrate to temperatures of from 500° C. to 800° C. (more preferably from about 580 to 750 degrees C.) for a sufficient period of time, e.g., 1 to 15 minutes, to attain the desired result, e.g., thermal tempering, bending, and/or heat strengthening) and after assembly into an IG unit, which approximately match an IG unit having a non-HT coating of Table 1 above. Optical characteristics herein are measured with regard to Ill. C, 2 degree observer.

TABLE 4

Example Characteristics of IG Window Units (HT)

| Characteristic | General | More Preferred | Most Preferred |
|---|---|---|---|
| $T_{vis}$ (or TY) (transmissive): | >=68% | >=70% | 69–72% |
| $a^*_t$: | −6.0 to +1.0 | −5.0 to 0 | −4.5 to −0.5 |
| $b^*_t$: | −1.0 to 4.0 | 0.5 to 3.5 | 0.5 to 3.5 |
| $L^*_t$: | 80 to 90 | 84 to 90 | 85 to 89 |
| $R_gY$ (glass side): | 5 to 15% | 8 to 12% | 9 to 11% |

TABLE 4-continued

Example Characteristics of IG Window Units (HT)

| Characteristic | General | More Preferred | Most Preferred |
|---|---|---|---|
| $a*_g$: | −4.0 to +2.0 | −3.0 to +1.0 | −3.0 to 0 |
| $b*_g$: | −4.0 to +3.0 | −3.0 to +1.5 | −3.0 to 1.5 |
| $L*_g$: | 34 to 42 | 36 to 40 | 36 to 40 |
| $R_fY$ (film side): | 6 to 18% | 9 to 16% | 11.5 to 14.5% |
| $a*_f$: | −5.0 to +4.0 | −2.0 to +3.0 | −1.0 to +2 |
| $b*_f$: | −8.0 to +8.0 | −3.0 to +2.0 | −3.0 to +1.5 |
| $L*_f$: | 38 to 48 | 40 to 46 | 41.5 to 44.5 |
| Sheet Resistance pre-HT: | >=8 ohms/sq. | >=10 ohms/sq. | >=11 ohms/sq. |
| Sheet Resistance post-HT | >=6 ohms/sq. | >=7 ohms/sq. | >=8 ohms/sq. |

It can be seen from the above that the optical characteristics of certain embodiments of this invention approximately match those of Table 2 above, even though the two coatings are entirely different (for a coating comparison, compare Tables 1 and 3 above). This is achieved due to the Si-rich nature of the silicon nitride layer(s) according to certain embodiments of this invention.

Moreover, in certain example embodiments of this invention it is desirable for the pre-HT sheet resistance ($R_s$) of the coating 3 to be at least 8 ohms/sq., more preferably at least 10 ohms/sq., and most preferably at least about 11 ohms/square so that the coating when on a glass substrate can be more easily heat treated in conventional low-tech radiant tempering furnaces. The coating, in certain embodiments before and/or after HT, has a sheet resistance less than 40 ohms/sq., more preferably less than 30 ohms/sq., and most preferably less than 20 ohms/sq.

EXAMPLES

The following two Example coated articles were made in accordance with certain embodiments of this invention. For each of the Examples, the coating/layer system 3 shown in FIG. 1 was sputtered onto a clear 3 mm thick 72 in.×84 in. soda-lime-silica float glass substrate 1. A sputter coating apparatus (BOC G-49 model) was used to sputter the coatings 3 onto the substrates 1. Cathode numbering utilizes the first digit to refer to the coater chamber, and the second digit to refer to the cathode position in that chamber. For example, cathode #32 was the second cathode (second digit) in the third (first digit) sputter chamber. In the sputter coater, the Ag and NiCr layers were sputtered onto the substrate 1 using DC power sputtering, while the other layers were sputtered onto the substrate using a mid-frequency AC type system. Below, "*" means Al content of approximately 10%. The line speed for each Example was 200 inches per minute. The coater/process setups for the Examples are in Tables 5–6. All gas flows (e.g., oxygen, argon, nitrogen) are presented in units of mL/minute, and the gas flow columns include both regular gas flow as well as trim/tuning gas flow. Volts refers to cathode volts, amps (A) refers to cathode amps, and power settings are set forth in units of kW. The NiCr targets were planar and approximately 80/20 NiCr, and the Ag target was planar. The Si/Al targets were dual C-Mag types.

The stoichiometric $Si_3N_4$ layer 13 in each Example was formed using a first argon to nitrogen gas flow ratio, while the non-stoichiometric Si-rich silicon nitride layer 5 was formed using a greater argon to nitrogen gas flow ratio as can be seen below, i.e., see in Tables 5–6 the greater amount of Ar used in sputtering Si-rich silicon nitride layer 5 than in stoichiometric silicon nitride layer 13 (evidencing the fact that less Si was nitrided in layer 5 than in layer 13). In other words, the Si-rich nature of layer 5 relative to layer 13 is shown by the higher Ar:N gas flow ratio in chamber 3 (for layer 5) than in chamber 5 (for layer 13). A difference(s) between Examples 1 and 2 is that in Example 2 the NiCr layers are about 25% thinner and the Si-rich silicon nitride layer 5 is about 5% thinner than in Example 1 (e.g., higher visible transmission results in Example 2). For example, in certain example embodiments of this invention the Ar:N gas flow ratio is at least 10% greater in sputtering layer 5 than layer 13, more preferably at least 20% greater.

TABLE 5

SPUTTER COATER SET-UP FOR EXAMPLE 1

| Cathode (mL/min.) | Target | Volts (V) | Amps (A) | Power (kW) | Ar (mL/min.) | $N_2$ |
|---|---|---|---|---|---|---|
| C31 | Si* | 583 | 40.5 | 25 | 1,536 | 1,140 |
| C32 | Si* | 547 | 43.4 | 25 | 1,536 | 1,140 |
| C33 | Si* | 449 | 54.6 | 25 | 1,536 | 1,140 |
| C34 | Si* | 487 | 52.5 | 25 | 1,536 | 1,140 |
| C35 | Si* | 611 | 36.1 | 25 | 1,536 | 1,140 |
| C36 | Si* | 621 | 37.2 | 25 | 1,536 | 1,140 |
| C41 | NiCr | 426 | 8.8 | 4.3 | 1,141 | 0 |
| C42 | Ag | 459 | 10.9 | 5 | 1,141 | 0 |
| C43 | NiCr | 432 | 9.9 | 4.4 | 1,141 | 0 |
| C51 | Si* | 560 | 48 | 27 | 1,033 | 1,411 |
| C52 | Si* | 590 | 44 | 27 | 1,033 | 1,411 |
| C53 | Si* | 542 | 48 | 27 | 1,033 | 1,411 |
| C54 | Si* | 568 | 45 | 27 | 1,033 | 1,411 |
| C55 | Si* | 553 | 48 | 27 | 1,033 | 1,411 |
| C56 | Si* | 570 | 48 | 27 | 1,033 | 1,411 |

TABLE 6

SPUTTER COATER SET-UP FOR EXAMPLE 2

| Cathode (mL/min.) | Target | Volts (V) | Amps (A) | Power (kW) | Ar (mL/min.) | $N_2$ |
|---|---|---|---|---|---|---|
| C31 | Si* | 580 | 40 | 24 | 1,536 | 1,140 |
| C32 | Si* | 548 | 43 | 24 | 1,536 | 1,140 |
| C33 | Si* | 446 | 54 | 24 | 1,536 | 1,140 |
| C34 | Si* | 478 | 52 | 24 | 1,536 | 1,140 |
| C35 | Si* | 612 | 36 | 24 | 1,536 | 1,140 |
| C36 | Si* | 617 | 37 | 24 | 1,536 | 1,140 |
| C41 | NiCr | 418 | 8.2 | 3.4 | 1,141 | 0 |
| C42 | Ag | 459 | 10.9 | 5 | 1,141 | 0 |
| C43 | NiCr | 422 | 9.9 | 3.5 | 1,141 | 0 |
| C51 | Si* | 560 | 48 | 27 | 1,033 | 1,411 |
| C52 | Si* | 590 | 44 | 27 | 1,033 | 1,411 |
| C53 | Si* | 542 | 48 | 27 | 1,033 | 1,411 |
| C54 | Si* | 568 | 45 | 27 | 1,033 | 1,411 |
| C55 | Si* | 553 | 48 | 27 | 1,033 | 1,411 |
| C56 | Si* | 570 | 48 | 27 | 1,033 | 1,411 |

The coated substrates of Examples 1 and 2, coated as set forth above, were then measured and determined to have the following optical characteristics (monolithic, as coated non-HT), measured in accordance with Ill. C., 2 degree observer.

TABLE 7

EXAMPLES 1–2 (MONOLITHIC AS COATED - NON-HT)

| Characteristic | Example 1 | Example 2 |
|---|---|---|
| $T_{vis}$ (or TY) (transmissive): | 69.08% | 72.38% |
| $a*_T$: | −3.6 | −3.25 |
| $b*_T$: | 3.58 | 2.47 |
| $R_gY$ (glass side): | 5.22% | 5.09% |

TABLE 7-continued

EXAMPLES 1–2 (MONOLITHIC AS COATED - NON-HT)

| Characteristic | Example 1 | Example 2 |
|---|---|---|
| $a^*_g$: | 1.5 | 0.02 |
| $b^*_g$: | −2.33 | −0.51 |
| $L^*_g$: | n/a | n/a |
| $R_fY$ (filmside): | 7.63% | 6.19% |
| $a^*_f$: | 6.7 | 5.64 |
| $b^*_f$: | 13.14 | 10.87 |
| Sheet Resistance ($R_s$): | 11.8 ohms/sq. | 12.3 ohms/sq. |

The coated substrates of Examples 1 and 2 were then heat treated (HT) at about 625 degrees C. for about 5 minutes, and thereafter had the following optical characteristics as set forth in Table 8 (Ill. C., 2 deg. observer).

TABLE 8

EXAMPLES 1–2 (MONOLITHIC POST-HT)

| Characteristic | Example 1 | Example 2 |
|---|---|---|
| $T_{vis}$ (or TY) (transmissive): | 77.1% | 80.42% |
| $a^*_t$: | −4.06 | −3.27 |
| $b^*_t$: | 1.91 | 0.78 |
| $R_gY$ (glass side): | 5.09% | 4.90% |
| $a^*_g$: | 0.82 | −0.21 |
| $b^*_g$: | −1.78 | −0.90 |
| $L^*_g$: | n/a | n/a |
| $R_fY$ (film side): | 6.78% | 5.37% |
| $a^*_f$: | 4.9 | 3.46 |
| $b^*_f$: | 9.07 | 6.16 |
| Sheet Resistance ($R_s$): | 9.9 ohms/sq. | 9.7 ohms/sq. |

The HT coated glass substrates of Examples 1 and 2 were then coupled to other respective 3 mm thick clear glass substrates to form IG units as shown in FIG. 2. The resulting IG units had the following optical characteristics (see Table 9 below; Ill. C, 2 deg. observer).

TABLE 9

EXAMPLES 1–2 (HT-IG Units)

| Characteristic | Example 1 | Example 2 |
|---|---|---|
| $T_{vis}$ (or TY) (transmissive): | 69.52% | 72.24% |
| $a^*_t$: | −4.67 | −4.09 |
| $b^*_t$: | 1.12 | 0.86 |
| $L^*_t$: | 86.76 | 88.08 |
| $R_gY$ (glass side): | 9.49% | 9.56% |
| $a^*_g$: | −1.55 | −1.94 |
| $b^*_g$: | −0.48 | −0.23 |
| $L^*_g$: | 36.91 | 37.03 |
| $R_fY$ (film side): | 13.4% | 12.17% |
| $a^*_f$: | 0.9 | 0.44 |
| $b^*_f$: | 4.77 | 2.95 |
| $L^*_f$: | 43.35 | 41.49 |

As can be seen from comparing Tables 2 and 9, it can be seen that even though the coatings of FIG. 1 of the instant application (i.e., an embodiment of this invention) and those of Ser. No. 09/978,184 are very different, IG units utilizing HT coatings of FIG. 1 of this application approximately match IG units utilizing non-HT coatings of Ser. No. 09/978,184 with regard to visible transmission ($T_{vis}$), visible glass side reflectance ($R_gY$), transmissive color (a* and/or b*), and/or glass side reflective color (a* and/or b*). This is made possible due to the fact that silicon nitride layer 5 is made Si-rich in certain embodiments of this invention by a sufficient amount.

Referring to FIG. 2, those skilled in the art will recognize that glass side reflective color (e.g., $a^*_g$ and $b^*_g$) means reflective color as viewed from the same side of the IG unit as where the sun is located in FIG. 2 (film side reflective color is reflective color as viewed from the other side of the IG unit—i.e., from the interior of the building).

Another example (Example 3) was made using a different sputter coating apparatus, namely a Leybold Terra-G I sputter coating apparatus. The layer stack of Example 3 was the same as in Examples 1–2 above and the same type targets were used in the sputtering, although different gas flows were used due to the different machine as will be appreciated by those skilled in the art. The results associated with Example 3 are set forth below in Table 10.

TABLE 10

EXAMPLE 3

| Characteristic | Mono (non-HT) | Mono (HT) | IG Unit (HT) |
|---|---|---|---|
| $T_{vis}$ (or TY) (transmissive): | 72.64% | 79.03% | 71.92% |
| $a^*_t$: | −3.86 | −3.79 | −4.2 |
| $b^*_t$: | 4.13 | 1.54 | 1.73 |
| $L^*_t$: |  |  | 87.93 |
| $R_gY$ (glass side): | 5.62% | 5.03% | 9.71% |
| $a^*_g$: | −0.21 | −0.96 | −2.45 |
| $b^*_g$: | 1.95 | 0.68 | 1.03 |
| $L^*_g$: | 28.43 | 26.8 | 37.31 |
| $R_fY$ (film side): | 5.72% | 5.38% | 12.09% |
| $a^*_f$: | 7.66 | 3.88 | 1.51 |
| $b^*_f$: | 2.88 | 3.4 | 1.18 |
| $L^*_f$: | 28.69 | 27.75 | 41.36 |
| Sheet Resistance ($R_s$ - ohms/sq): | 11.6 | 8.73 |  |

Again, as can be seen from comparing Tables 2 and 10, it can be seen that even though the coatings of FIG. 1 of the instant application (i.e., an embodiment of this invention) and those of Ser. No. 09/978,184 are very different, IG units utilizing HT coatings of FIG. 1 (Example 3) of this application approximately match IG units utilizing non-HT coatings of Ser. No. 09/978,184 with regard to visible transmission ($T_{vis}$), visible glass side reflectance ($R_gY$), transmissive color (a* and/or b*), and/or glass side reflective color (a* and/or b*). This is made possible due to, for example, the fact that silicon nitride layer 5 is made Si-rich in certain embodiments of this invention by a sufficient amount.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insulating glass (IG) window unit comprising:
   first and second glass substrates spaced apart from one another so that a space is provided therebetween, at least the first glass substrate being thermally tempered and supporting a coating, wherein the coating comprises:
   a first dielectric layer comprising silicon nitride $Si_xN_y$,
   a first contact layer,
   a layer comprising Ag,
   a second contact layer, wherein the layer comprising Ag is located between and directly contacts each of said first and second contact layers, and
   a second dielectric layer,
   wherein the first dielectric layer comprising silicon nitride $Si_xN_y$ is Si-rich so that x/y is from 0.76 to 2.0, and so that after thermal tempering of the first substrate with the coating thereon the coating has a sheet resistance ($R_s$) of at least 7 ohms/square, and wherein the IG window unit has a visible transmission of at least 69%, transmissive a* color of from −6.0 to 1.0, transmissive b* color of from −1.0 to 4.0, glass side reflective a* color of from −4.0 to 2.0, and glass side reflective b* color of from −4.0 to 3.0.

2. The IG window unit of claim 1, wherein the first dielectric layer comprising silicon nitride has an index of refraction "n" of from 2.15 to 2.6, and wherein after the tempering the coating has a sheet resistance ($R_s$) of at least 8 ohms/square.

3. The IG window unit of claim 1, wherein the first dielectric layer comprising silicon nitride has an index of refraction "n" of from 2.15 to 2.6 and an extinction coefficient "k" less than or equal to 0.07.

4. The IG window unit of claim 1, wherein the first dielectric layer comprising silicon nitride has an index of refraction "n" of from 2.2 to 2.5 and an extinction coefficient "k" less than or equal to 0.06.

5. The IG window unit of claim 1, wherein the first dielectric layer comprising silicon nitride has an index of refraction "n" of from 2.35 to 2.45.

6. The IG window unit of claim 1, wherein the first dielectric layer comprising silicon nitride has an index of refraction "n" of from 2.15 to 2.6 and an extinction coefficient "k" of from 0.0001 to 0.05.

7. The IG window unit of claim 1, wherein at least one of the first and second contact layers comprises NiCr.

8. The IG window unit of claim 1, wherein each of the first and second contact layers comprise NiCr.

9. The IG window unit of claim 1, wherein the second dielectric layer comprises silicon nitride.

10. The IG window unit of claim 1, wherein the coating includes only a single Ag layer.

11. The IG window unit of claim 1, wherein prior to the tempering the coating has a sheet resistance ($R_s$) of at least 8 ohms/square.

12. The IG window unit of claim 11, wherein prior to the tempering the coating has a sheet resistance ($R_s$) of at least 10 ohms/square.

13. The IG window unit of claim 1, wherein the first dielectric layer comprising silicon nitride is located between the first glass substrate and the layer comprising Ag.

14. The IG window unit of claim 1, wherein the first dielectric layer comprising silicon nitride is in direct contact with the first glass substrate.

15. The IG window unit of claim 1, wherein the first dielectric layer comprising silicon nitride is from 300 to 600 Å thick, and the layer comprising Ag is metallic and is from 50 to 200 Å thick.

16. The IG window unit of claim 1, wherein the IG unit has a visible transmission of at least 70%, transmissive a* color of from −5.0 to 0, transmissive b* color of from 0.5 to 3.5, glass side reflective a* color of from −3.0 to 1.0, and glass side reflective b* color of from −3.0 to 1.5.

17. An insulating glass (IG) window unit comprising:
first and second glass substrates spaced apart from one another, the first glass substrate supporting a coating, wherein the coating comprises:
a first dielectric layer comprising silicon nitride $Si_xN_y$,
only one layer comprising Ag,
a second dielectric layer, and
wherein the first dielectric layer comprising silicon nitride $Si_xN_y$ is characterized in that x/y is from about 0.76 to 2.0, and wherein the coating has a sheet resistance ($R_s$) of at least 6 ohms/square after heat treatment at temperature(s) of at least 500 degrees C.

18. The IG window unit of claim 17, wherein the IG window unit, after the heat treatment of the first substrate and the coating, has a visible transmission of at least 69%, transmissive a* color of from −6.0 to 1.0, transmissive b* color of from −1.0 to 4.0, glass side reflective a* color of from −4.0 to 2.0, and glass side reflective b* color of from −4.0 to 3.0.

19. The IG window unit of claim 17, wherein the coating has a sheet resistance ($R_s$) of from 7 to 30 ohms/square before and/or after the heat treatment.

20. The IG window unit of claim 17, wherein the IG window unit has a visible transmission of at least 70%, transmissive a* color of from −5.0 to 0, transmissive b* color of from 0.5 to 3.5, glass side reflective a* color of from −3.0 to 1.0, and glass side reflective b* color of from −3.0 to 1.5.

21. The IG window unit of claim 17, wherein the first dielectric layer comprising silicon nitride has an index of refraction "n" of from 2.2 to 2.5 and an extinction coefficient "k" less than or equal to 0.06.

22. A coated article including a coating supported by a glass substrate, the coating comprising:
a first dielectric layer comprising silicon nitride $Si_xN_y$,
a first contact layer,
an IR reflecting layer,
a second contact layer, wherein the IR reflecting layer is located between and directly contacts each of said first and second contact layers, and
a second dielectric layer, and
wherein the first dielectric layer comprising silicon nitride is Si-rich so as to have an index of refraction "n" of from 2.15 to 2.6 and an extinction coefficient "k" less than or equal to 0.07; and
wherein the coating has a sheet resistance of from 7 to 40 ohms/square.

23. The coated article of claim 22, wherein the IR reflecting layer comprises Ag, and wherein the coating includes only one layer comprising Ag.

24. The coated article of claim 22, wherein at least one of the first and second contact layers comprises NiCr, and wherein the second dielectric layer comprises silicon nitride.

25. The coated article of claim 22, wherein the first dielectric layer comprising silicon nitride has an index of refraction "n" of from 2.2 to 2.5 and an extinction coefficient "k" less than or equal to 0.06.

26. A method of making a window, the method comprising:
providing first and second substrates, at least the first substrate comprising glass;
forming a first dielectric layer comprising silicon nitride on the first substrate in a manner so as to have an index of refraction "n" of from 2.15 to 2.6 and an extinction coefficient "k" less than or equal to 0.07;
forming an IR reflecting layer on the first substrate over the first dielectric layer;
forming at least one additional dielectric layer on the first substrate over the IR reflecting layer, wherein the coating has a sheet resistance of from 7–40 ohms/square;
thermally tempering the first substrate with the coating thereon; and
after said tempering, coupling the first substrate to the second substrate to form the window, the window having transmissive a* color of from 6.0 to 1.0, transmissive b* color of from −1.0 to 4.0, glass side reflective a* color of from −4.0 to 2.0, and glass side reflective b* color of from −4.0 to 3.0.

27. The method of claim 26, wherein the first dielectric layer comprising silicon nitride has an index of refraction "n" of from 2.2 to 2.5 and an extinction coefficient "k" less than or equal to 0.06.

28. A coated article comprising:

a glass substrate supporting a coating having a sheet resistance ($R_s$) of from 7 to 40 ohms/square before and/or after heat treatment, wherein the coating includes a layer comprising Ag and a dielectric layer comprising non-stoichiometric silicon nitride having an index of refraction "n" of from 2.2 to 2.5 and an extinction coefficient "k" less than or equal to 0.06.

29. The coated article of claim 28, wherein the coating includes only one layer comprising Ag.

30. The coated article of claim 28, wherein the coated article comprises an IG window unit having at least three of: (i) a visible transmission of at least 69%, (ii) transmissive a* color of from −6.0 to 1.0, (iii) transmissive b* color of from −1.0 to 4.0, (iv) glass side reflective a* color of from −4.0 to 2.0, and (v) glass side reflective b* color of from −4.0 to 3.0.

31. A method of making an IG window unit, the method comprising:

forming a coating on a glass substrate so as to have a sheet resistance ($R_s$) of from 8 to 30 ohms/square before heat treatment, wherein the coating includes a layer comprising Ag and a dielectric layer comprising Si-rich silicon nitride having an index of refraction "n" of from 2.2 to 2.5 and an extinction coefficient "k" less than or equal to 0.06;

thermally tempering the glass substrate having the coating thereon; and after the tempering, coupling the glass substrate with the coating thereon to another substrate to form an IG window unit having at least three of: (i) a visible transmission of at least 68%, (ii) transmissive a* color of from −6.0 to 1.0, (iii) transmissive b* color of from −1.0 to 4.0, (iv) glass side reflective a* color of from −4.0 to 2.0, and (v) glass side reflective b* color of from −4.0 to 3.0.

32. The method of claim 31, wherein the IG window unit has at least four of (i)–(v).

* * * * *